(No Model.)

C. A. CAVANAGH.
CLOTH STRETCHING MACHINE.

No. 463,658. Patented Nov. 24, 1891.

Witnesses:
Howard A. Fletcher
William H. Potter

Inventor.
Charles A. Cavanagh

UNITED STATES PATENT OFFICE.

CHARLES A. CAVANAGH, OF LINCOLN, ASSIGNOR TO C. A. LUTHER & CO., OF PAWTUCKET, RHODE ISLAND.

CLOTH-STRETCHING MACHINE.

SPECIFICATION forming part of Letters Patent No. 463,658, dated November 24, 1891.

Application filed April 22, 1891. Serial No. 389,935. (No model.)

*To all whom it may concern:*

Be it known that I, CHARLES A. CAVANAGH, a citizen of the United States, residing at Lincoln, in the county of Providence and State of Rhode Island, have invented a new and useful Cloth-Stretching Machine, of which the following is a specification.

My invention relates to improvements in cloth-stretching machines in which the cloth is stretched transversely or in width and not in length, and the object of my improvement is to apply to the cloth or other fabric a transverse adjustable tension by which the fabric will be increased in width, and so increased pass directly to the calendering or other rolls. The accompanying drawings explain the method of accomplishing these results by my machine.

Figure 2:
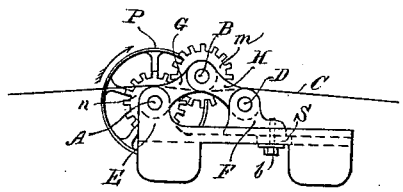
Figure 1:
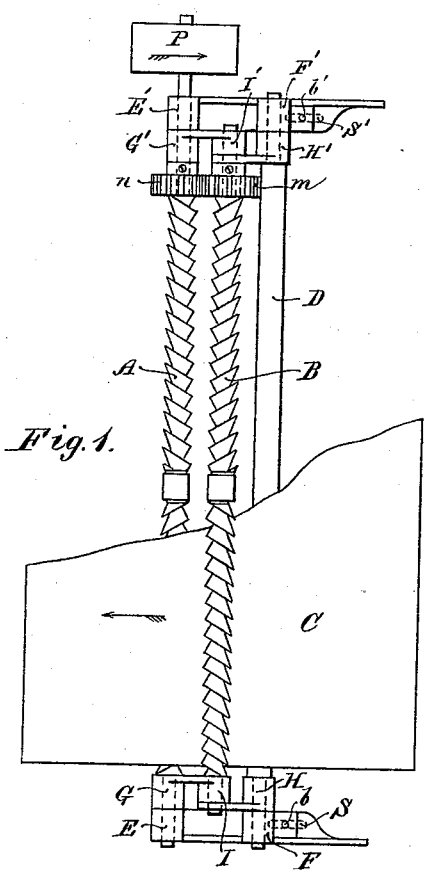

Figure 1 is a top view, and Fig. 2 an end view of the same.

Similar letters refer to similar parts throughout the drawings.

The essential elements of my improvement consist of three cylinders, two of which, revolving in opposite directions by means of suitable gearing, are deeply cut or threaded spirally, the thread having its origin at the middle of the length of each of the two cylinders, and thence running to the extremities of the two cylinders. Each of the two cylinders has thus a "right-handed" thread upon one half of its length and a "left-handed" thread upon the other half of its length, and the two cylinders are so arranged and placed upon the machine that the left-handed thread upon one cylinder is adjacent and in close juxtaposition to the right-handed thread upon the other cylinder.

Another important feature of my invention is that the relative positions of the three cylinders may be so adjusted or changed that the tension upon the fabric may be increased or diminished at will.

In Fig. 1 A, B, and D represent a top view of the three cylinders, A and B being the threaded and D being the smooth cylinder. C represents the fabric, the arrow showing its direction. The cylinder A revolves in the bearings E E', which are fixed and form a part of the heads of the machine. The cylinder B revolves in the bearings I I', which are supported by and form a part of the bearings G and G'. The cylinder D revolves in the bearings F and F', and these two bearings are, by means of the slots S S' and the bolts b b', adjustable upon the heads of the machine, so that the distance between the rolls A and D may be changed at pleasure. The cylinder or roll D revolves freely in the bearings F F' and serves simply as a rest for the fabric—*i. e.*, it does not revolve with the rest of the machine, but is set in motion wholly by the friction of the passing fabric, and its function is solely to serve as a means of increasing or decreasing the tension. Motion is communicated to the machine by the driving-pulley P, which is fixed upon the shaft of the cylinder A. Thence it is communicated to B by the gears n m. Connection between B and D is accomplished by means of the flanges attached to the bearings H H', as shown in Fig. 2 at H. The shaft of the roll B pierces these flanges at their upper extremities and revolves freely in them. It will thus be seen that the cylinder B is wholly supported by the flanges of the bearings G G' and H H', within which flanges it revolves freely.

The tension of the rolls is adjusted as follows: If the tension is to be increased, the bearings F F' are drawn away from the bearings E E' by means of the bolts and slots b b' S S'. As a result the roll B falls, the fabric C is forced more out of a direct line, and the tension or pressure of the cylinders correspondingly increased. A reversal of this operation will evidently decrease the tension on the fabric.

From the foregoing description the operation of the machine is evident. The fabric is drawn rapidly through between the cylinders by the calender or other rolls. A revolving in one direction and B in the opposite direction on opposite sides of the cloth, the edges of the threads draw the fibers of the fabric from its center line toward its edges, thus removing all folds and wrinkles and increasing the width of the fabric. As is displayed in the drawings, the shape or form of the thread upon the cylinders A and B is such that it presents for contact with the fabric an acute angle, thus increasing the stretching tendency of the cylinders.

The various processes through which cloth of various kinds must pass before it is ready for the market—such as mangling, drying, singeing, calendering, and the like, and the well-known tendency of cloth to shrink in width under a longitudinal strain and to curl or fold at the selvage when rolled and unrolled—prove the efficacy and necessity of such a machine as mine, which, being light and compact, may be run at a high speed with the expenditure of a minimum of power.

What I claim as my invention, and desire to secure by Letters Patent, is—

In a cloth-stretching machine, the cylinders A and B, each threaded with a right and left handed thread, as described, in combination with the smooth cylinder D, having adjustable bearings F F' and bolts $b$ $b'$, with the slots S S', and the linked bearings H H' and G G', all substantially as and for the purposes described.

CHARLES A. CAVANAGH.

Witnesses:
HOWARD A. FLETCHER,
WILLIAM H. POTTER.